Patented Feb. 22, 1944

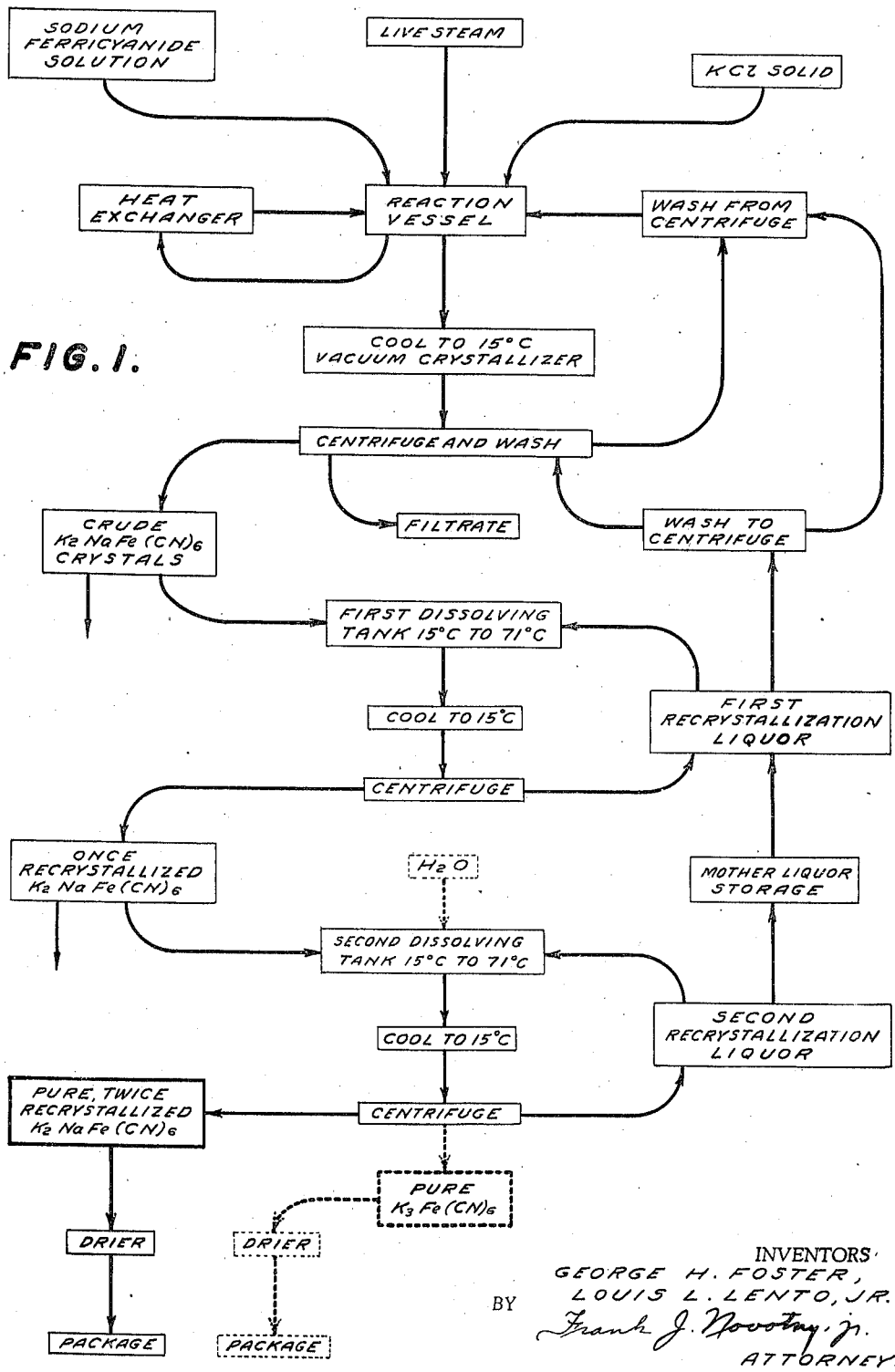

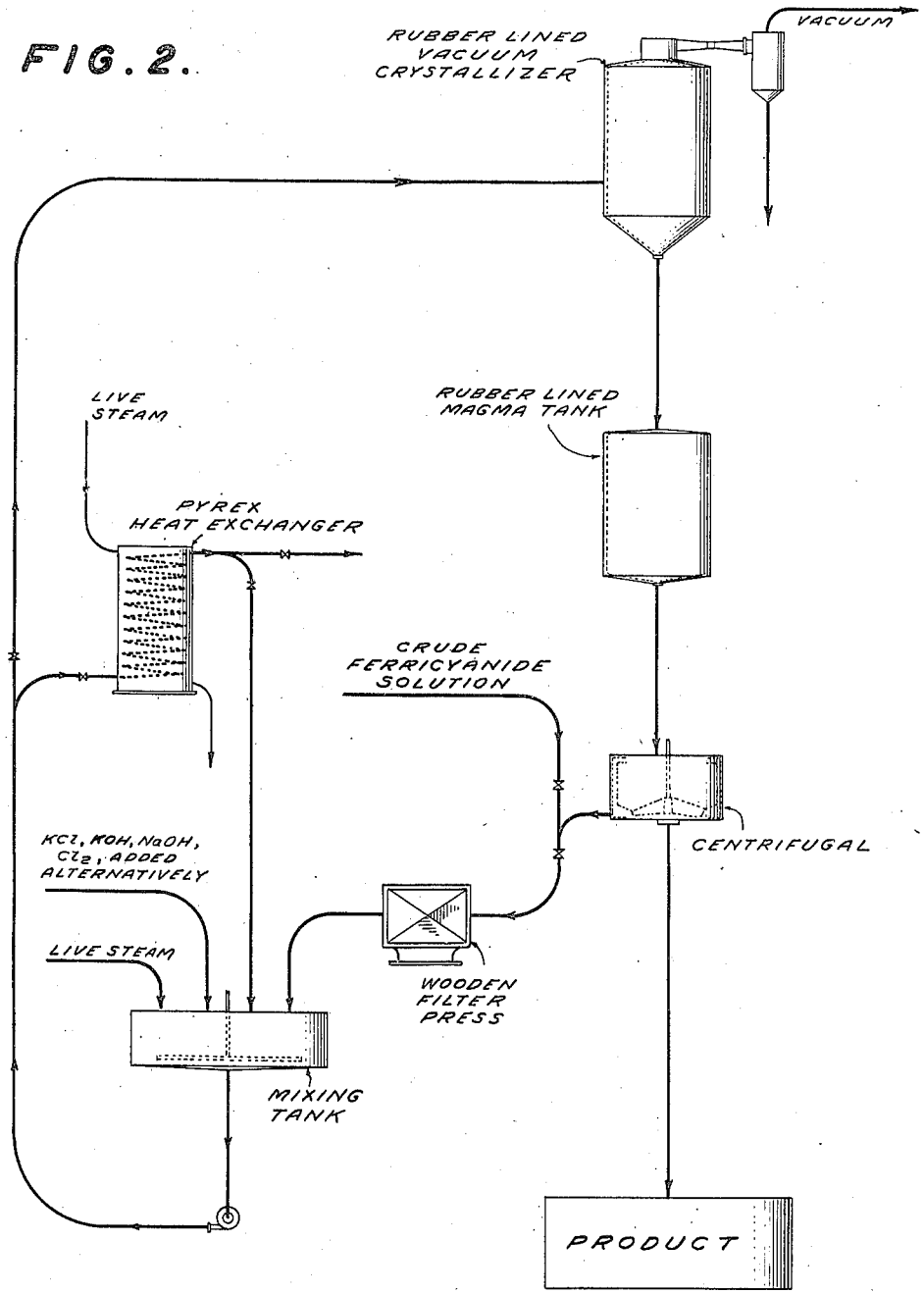

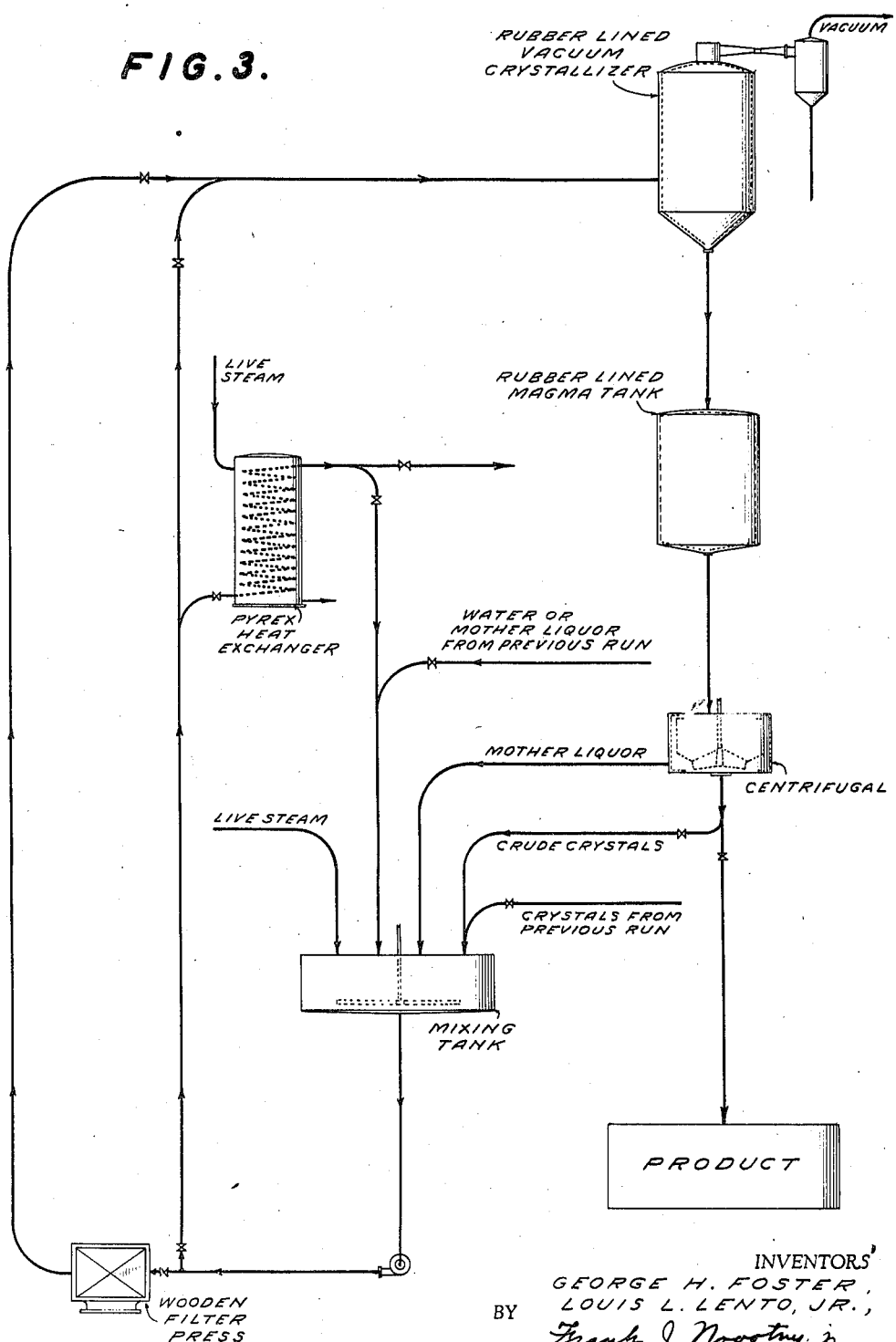

2,342,103

UNITED STATES PATENT OFFICE 2,342,103

METHOD FOR PRODUCING DIPOTASSIUM MONOSODIUM FERRICYANIDE

George H. Foster, Stamford, and Louis L. Lento, Jr., Springfield, Conn., assignors to American Cyanamid Company, New York, N. Y., a corporation of Maine Application April 12, 1941, Serial No. 388,236

9 Claims. (Cl. 23—77)

This invention relates to a method of controlling chemical reactions and more especially to improved apparatus for effecting a relatively close control of the temperature and supply of water for a designated chemical process whereby a product of uniform grade and purity is obtained even where the batches reacted are large from a commercially feasible viewpoint.

In commercial production on a plant scale, particularly in processes which have proved successful in the pilot plant, numerous localized reactions take place, heretofore uncontrollable, but which on a semi-plant or larger scale result in the production of considerable amounts of decomposition products and thus unduly cut down the yield of the desired product. Invariably such impaired yields are the result of inability of the apparatus to effect a complete control of the reactions due principally to its failure to balance the heat and water losses occurring during the reactions.

It is a principal object of this invention to provide apparatus which, during the course of a reaction effected therein, is practically free from excessive local overheating. A further object is the provision of apparatus capable of practically instantaneous distribution of added water, heating and cooling fluids, alkaline or similar media, whereupon an excessive local concentration of an added reactant or of added heating and/or cooling substances cannot possibly occur therein. Another object of the apparatus of this invention and a method of use thereof, as more fully described below, is to control the frothing usually accompanying the liberation of entrapped gases so effectively as to avoid completely the disruption and loss of control occurring in many of the usual commercial processes and further effectively to decrease the extent of the simultaneously occurring side reactions which usually accompany the same.

These objects are accomplished in accordance with the teachings of this invention by an adaptation of a combination of apparatus such as that shown schematically in the drawings forming a part of this description, and wherein:

Figure 1 is a flow sheet diagrammatically illustrating one embodiment;

Figure 2 is a detailed view of a portion of the apparatus indicated in Figure 1, especially adapted for metathetical reactions: and Figure 3 shows apparatus embodying the present invention and especially adapted for recrystallization processes.

In its broadest aspect, the invention contemplates the use of live steam either as a principal or additional source of heat, the steam during condensation serving as a means of agitation and afterwards upon condensation as a source of an aqueous diluent for the reaction products. In this manner the source of heat in the form of hot or live steam is rapidly moved through the reacting mass without causing any one portion thereof to become excessively overheated and without excessive dilution of the reactants with its consequent retardation of the reaction.

More particularly, the principles herein involved may be clearly illustrated by carrying out a double substitutive reaction, such as that between sodium ferricyanide and potassium chloride, in the apparatus of Figure 2. In this schematic diagram the addition of a solid potassium salt such as the chloride, sulfate, nitrate, carbonate or the like to an aqueous solution of sodium ferricyanide, preferably containing more than 25% of the latter is clearly illustrated. The amount of potassium salt added should be from 1 to 4 mols per mol of sodium ferricyanide. The mixture is heated to 71° C. with live steam and results in the formation of dipotassium monosodium ferricyanide, the low solubility of the double salt in the solution substantially saturated with the potassium salt causes the former to precipitate out. Further copious quantities of the double salt are precipitated by further concentrating the solution in the vacuum crystallizer wherein evaporation yields a slurry which is rapidly cooled to about 15° C. with the aid of a vacuum evaporation and an accompanying loss of water; this results in a concentrated solution and the dipotassium monosodium ferricyanide dissolved therein precipitates at an increased rate. It is readily separated out by centrifuging, to yield a product substantially 99% pure and containing less than 1% of chlorides.

This product may be further purified in apparatus of the type shown in Figure 3 by dissolving the above double salt in mother liquor from a prior crystallization step, whereupon heating with live steam to 71° C., aided by a heat exchanger as shown, followed by evaporation of the solution and cooling to 15° C. yields a slurry which upon centrifuging gives a product, dipotassium monosodium ferricyanide, of 99.5% purity while the chloride content decreases to less than .1%. By repeating this process, a recrystallized product of reagent grade is obtained inasmuch as it contains less than .01% of chlorides and less than .05% of potassium ferrocyanide or sodium ferrocyanide.

The following examples illustrate various methods of embodying the invention and disclose the principles involved with still more particularity:

*Example 1*

The rubber lined potassium chloride treating tank of Figure 2 was charged with 1600 pounds of a 27% aqueous sodium ferricyanide solution and 4000 pounds of previously used wash liquor. The batch was then circulated through the heat exchanger with constant stirring until heated to 60° C. Then approximately 4000 pounds of solid potassium chloride were added and the mixture heated to 71° C., and agitated for ½ an hour while keeping the temperature at 71° C. by passing live steam therethrough. The solution of $K_2NaFe(CN)_6$ formed was then drawn off to the vacuum crystallizer and cooled by evaporation to 15° C. When crystals began to form, the slurry was filtered in a centrifuge and the filtrate (by-product liquor) was collected for potassium ferrocyanide recovery. The centrifuge cake was washed with mother liquor from a previous recrystallization and the wash liquor recycled to help make up the next batch in the potassium chloride treating tank.

*Example 2*

The crude crystals of $K_2NaFe(CN)_6$ obtained as in Example 1 were purified by recrystallization in apparatus such as that shown in Figure 3. About 3000 to 4000 pounds of the crude crystals were charged into a recrystallization tank together with about 2000 to 3000 pounds of water and 14,000 to 16,000 pounds of mother liquor from a previous recrystallization. This solution was circulated through a heat exchanger until it attained a temperature of about 60° C. whereupon further heating to 71° C. was effected with the aid of live steam passed therethrough. This hot solution was agitated for ½ hour and then cooled by evaporation in the vacuum crystallizer to about 15° C. whereafter filtration in a centrifuge yielded highly purified $K_2NaFe(CN)_6$ of about 99.5% purity. The mother liquor was collected for subsequent use. The crystals were subsequently washed followed by recycling the wash liquor to the HCl treating tank to complete the purification step. This crystallized dipotassium monosodium ferricyanide can be recrystallized in a similar manner in order to obtain a product of reagent grade or else granulated and blended for packaging and sale.

It is to be noted that the apparatus of this invention, by slight modification of the process may be used for the oxidation of ferrocyanides in order to obtain ferricyanides as in the following example.

*Example 3*

22 pounds of water, 22 pounds of solid potassium ferrocyanide and 5 pounds of solid potassium hydroxide were mixed in a reaction vessel similar to that of Figure 2. However, in place of KCl, chlorine was used. 6 pounds of chlorine were admitted by bubbling through an alundum diffuser submerged in the reaction medium. The mixture was heated to 40° C. by flowing live steam into the bath for a period of 6 hours after which the batch was allowed to settle and the crude liquor decanted off and cooled by evaporation under reduced pressure as in the previous examples. Crude crystals of potassium ferricyanide precipitated out of the solution and were separated by filtration in a centrifuge. The mother liquor was stored for subsequent use in the preparation of a new batch.

*Example 4*

In the same manner as in Example 3, 25 pounds of water were mixed with 25 pounds of solid potassium ferrocyanide, 8.5 pounds of solid KOH and 7 pounds of chlorine. The reaction mass was heated to 54° C. for 8½ hours by blowing in steam. More caustic potash was added and then ice was used to cool the batch. At a temperature of 25° C. crystals precipitated out and were collected in the centrifuge. By adding about 7.8 pounds of water to 12.9 pounds of the above crystals and heating to 80° C. by blowing in steam and subsequently cooling the reaction mixture by evaporation, a large crop of purified $K_3Fe(CN)_6$ crystals were obtained. When pure water was added in excess, i. e., 12.9 pounds of water to 12.9 pounds of crystals, recrystallization could not be effected because the resultant solution was excessively dilute. The slight amount of water added by the condensed steam, however, was not sufficient to dilute the solution excessively and prevent the recrystallization of the desired product.

*Example 5*

A crude sodium ferricyanide solution containing 27% of this salt and 4% sodium chloride and having a pH of about 8.3 was treated under constant agitation in apparatus similar to that of Example 3 with a sufficient quantity of a 25% caustic soda solution to give a solution having a pH of 9.5. Then 0.75% excess of caustic soda, based on the weight of the batch being treated, was added to insure the decomposition of the ferro-ferri complexes, and the reaction mixture was heated to not exceeding 65° C. by flowing steam therethrough. The color of the initial crude ferricyanide solution was an opalescent green due to the colloidal complexes present, whereas after the caustic soda treatment and a filtering step to remove ferric hydroxide, sodium ferrocyanide and other insolubles, the color was a clear red. The removal of these undesirable products and the subsequent filtration step are greatly accelerated by cooling the reaction mixture to 15° C. as by evaporation of the aqueous solvent under reduced pressure prior to filtration. The filter cake may be discarded or treated for subsequent by-product recovery.

*Example 6*

100 cc. of an aqueous solution of crude sodium ferricyanide containing 27 to 28% solute and having a dark green cast and a pH of 8.4 to 8.7 was mixed in apparatus similar to that used in Example 5 with a sufficient quantity of a 25% aqueous solution of sodium hydroxide to raise the pH of the mixture to between 9.3 and 9.5 at 25° C. A slight excess of sodium hydroxide was then added and the mixture heated to 65° C. by flowing steam therethrough to decompose the ferro-ferri complexes. The decomposition products were then removed from the reaction mixture in the vacuum evaporator and this was followed by filtration. The filter cake consisted of ferric hydroxide, sodium ferrocyanide and other insolubles resulting from the decomposition of the blue-green colloidal iron complexes and therefore it was discarded. The filtrate consisting of a clear, deep orange colored solution of sodium ferricyanide was stable, undergoing no further color change on storage. The pure filtrate contained sodium ferricyanide in such an uncontaminated condition that it served as a valuable intermediate for the preparation of mixed ferricyanide salts such as the potassium and sodium double salts which have found favorable market in the blue-printing arts because of their content of 105% of ferricyanide compared to potassium ferricyanide as a basis.

The above process as illustrated by the flow sheet may be operated as a closed cycle and the mother liquors obtained in the various steps may be recycled as shown. The use of steam as a source of heat serves as an additional means of agitation, supplementing the usual mixing blade and thoroughly mixing the reacting ingredients and simultaneously maintaining the added water (that obtained by steam condensation) at a minimum. The subsequent cooling of the reaction mixture by vacuum evaporation effects a return or balancing of the amount of water present and results in a commercially feasible process, one that avoids excessive dilution and subsequent evaporation of superfluous water. Thus a pure crystalline product is readily obtained by this process which effects a ready precipitation of the crystals without unnecessarily exposing the product to excessive ranges of heat and pH values. The process simultaneously avoids any unnecessary dilution and hence the subsequent concentration of the reaction medium, as by costly evaporation processes for the removal of excess water, is greatly facilitated. Such undue evaporation steps have heretofore rendered numerous processes commercially unfeasible.

Although the examples given have been drawn to specific and particular embodiments, it is to be understood that the invention is not limited thereto but is to be construel broadly within the scope of the appended claims.

We claim:

1. The method of preparing dipotassium monosodium ferricycanide which comprises reacting sodium ferricyanide with potassium chloride in aqueous solution rendered alkaline to a pH of at least 8.3 while heating the solution by flowing steam therethrough, condensing the steam therein and subsequently cooling the aqueous solution and removing water from the solution by flash-evaporation to a temperature of 15° C. to precipitate out dipotassium monosodium ferricyanide and separating the latter from the mother liquor.

2. The method of claim 1, in which the medium is rendered alkaline with an alkali metal hydroxide.

3. The method of claim 1 in which the medium is rendered alkaline with sodium hydroxide.

4. The method of claim 1 in which the reaction is effected at a temperature of 40° to 65° C.

5. The method of preparing dipotassium monosodium ferricyanide which comprises the steps of treating an aqueous solution of sodium ferricyanide containing at least 25% sodium ferricyanide with a caustic soda solution until the pH is substantially 8.3, adding a quantity of a solid inorganic potassium salt and heating the solution by flowing steam therethrough to a temperature of substantially 65° C. while subjecting the solution to constant agitation to insure equal distribution of the heat through the solution and avoid excessive local heating of the sodium ferricyanide and its accompanying decomposition to ferrocyanides, condensing the steam therein until sufficient water is formed therefrom to dissolve all the reactants at 65° C., concentrating the solution by flash-evaporation to saturate and simultaneously cool the solution to 15° C. and separating the dipotassium monosodium ferricyanide from the reaction mixture.

6. The method of preparing dipotassium monosodium ferricyanide which comprises the steps of treating an aqueous solution of sodium ferricyanide containing at least 25% sodium ferricyanide with a caustic soda solution until the pH is substantially 8.3, adding a quantity of solid potassium chloride and heating the solution by flowing steam therethrough to a temperature of 60° to 71° C. while subjecting the solution to constant agitation to insure equal distribution of the heat through the solution and avoid excessive local heating of the sodium ferricyanide and its accompanying decomposition to ferrocyanides, condensing the steam therein until sufficient water is formed therefrom to dissolve all the reactants at 65° C., concentrating the solution by flash-evaporation to saturate and simultaneously cool the solution to 15° C. and separating the dipotassium monosodium ferricyanide from the reaction mixture.

7. The method of claim 5 in which the potassium salt is the chloride, the reactants being added in the proportion of one mol of sodium ferricyanide and 1 to 4 mols of potassium chloride.

8. The method of claim 5 in which the potassium salt is the chloride, the reactants being added in the proportion of one mol of sodium ferricyanide and 1 to 4 mols of potassium chloride, and the dipotassium monosodium ferricyanide product is obtained from the reaction mixture, recovering the dipotassium monosodium ferricyanide and returning the mother liquor to the cycle.

9. The method of claim 6 with the additional steps of recrystallizing the thus obtained crude dipotassium monosodium ferricyanide by forming an aqueous solution therefrom, heating the solution by flowing steam therethrough to a temperature of 60° to 71° C., adding additional quantities of the crude ferricyanide thereto, and repeating the cycle.

GEORGE H. FOSTER.
LOUIS L. LENTO, Jr.